United States Patent
Kuo et al.

(10) Patent No.: US 7,760,453 B2
(45) Date of Patent: Jul. 20, 2010

(54) LENS DISPLACEMENT DEVICE

(75) Inventors: Li-Te Kuo, Jhudong Township, Hsinchu County (TW); Mei-Ling Lai, Taiping (TW)

(73) Assignee: Wah Hong Industrial Corp., Kaohsiung (TW)

( * ) Notice: Subject to any disclaimer, the term of this patent is extended or adjusted under 35 U.S.C. 154(b) by 93 days.

(21) Appl. No.: 12/081,333

(22) Filed: Apr. 15, 2008

(65) Prior Publication Data

US 2008/0310037 A1      Dec. 18, 2008

(30) Foreign Application Priority Data

Jun. 18, 2007     (CN) ................. 2007 2 0152762 U (51) Int. Cl.
*G02B 7/02*      (2006.01)
*G02B 15/14*     (2006.01)

(52) U.S. Cl. .................................. 359/824; 359/694

(58) Field of Classification Search ......... 359/694–704, 359/819–824, 829; 396/133, 144
See application file for complete search history.

(56) References Cited

U.S. PATENT DOCUMENTS

| 5,541,777 | A  | * | 7/1996  | Sakamoto et al. | ............ 359/824 |
| 6,587,284 | B2 | * | 7/2003  | Santo et al.    | ................ 359/824 |
| 6,639,744 | B2 | * | 10/2003 | Ohno            | .......................... 359/824 |

* cited by examiner

*Primary Examiner*—Mohammed Hasan
(74) *Attorney, Agent, or Firm*—Rosenberg, Klein & Lee (57) ABSTRACT

The present invention provides a lens displacement device, applicable for moving micro image-capturing module lens, wherein the lens displacement device comprises: a lens slide base, a first hollow magnet, a hollow magnetic conducting plate, a second hollow magnet and a hollow coil. A first magnetic pole side of the hollow magnetic conducting plate is magnetically connected to the first hollow magnet, and a second magnetic pole side of the hollow magnetic conducting plate is magnetically connected to the second hollow magnet, which combined to form a magnetically connected assembly. The hollow coil is placed at the outer or inner perimeter of the magnetically connected assembly, and the hollow coil surrounds the magnetically connected assembly and they have a gap in-between them to allow for sliding. Herein the lens slide base rigidly connects the first hollow magnet of the magnetically connected assembly or the hollow coil.

21 Claims, 7 Drawing Sheets

LENS DISPLACEMENT DEVICE

BACKGROUND OF THE INVENTION

1. Field of the Invention

The present invention relates to a lens displacement device; in particular, to a displacement device applicable for moving micro image-capturing module lens.

2. Description of Related Art

In recent years, the trend of equipping hand-held devices with image-capturing modules is gradually becoming popular. While the product market of hand-held devices demonstrates stronger and stronger demands for better functionality and smaller size, the image-capturing module is at the same time confronted with two crucial requirements of higher resolution and size reduction. Quality enhancement of the captured images may be achieved by increasing pixels, whereby the image-capturing module in hand-held devices develops progressively from VGA-grade of 300K pixels to million, 2 millions, 3 millions or even higher to 4 or 5 millions pixels. In addition to the increase in pixel numbers, there are other factors such as image focusing that also affect image clarity. Thus the focusing function in the image-capturing module of hand-held device evolves from fixed focusing function to more advanced optical auto-focusing or even optically variable focusing as found in today's cameras.

The operational principle of optical auto-focusing function is to adequately move the lens in the image-capturing module according to different distance from the object appearing in the lens, such that the image of the intended object can precisely focus on the image sensor to generate clear image thereof. Currently, the common approaches of providing displacement functions to drive the motion of lens in an image-capturing module include step-motor displacement, piezo-electric displacement and voice coil based linear displacement etc. Herein the voice coil based linear displacement offers advantages of fast movement and direct linear motion, without the need of high precision screw rod transfer; meanwhile, at production stage, this approach can be more convenient, and allow flexibly combining integral space of image-capturing module for electro-magnetic field installation design, providing more favorable chance to reduce the integral size of image-capturing module. However, while emphasizing size-reduction, in order to acquire sufficient displacement force to move the lens, it also requires good design in magnetic circuits, so as to efficiently exploit limited magnetic force resource to generate sufficient displacement force.

Figure 1:
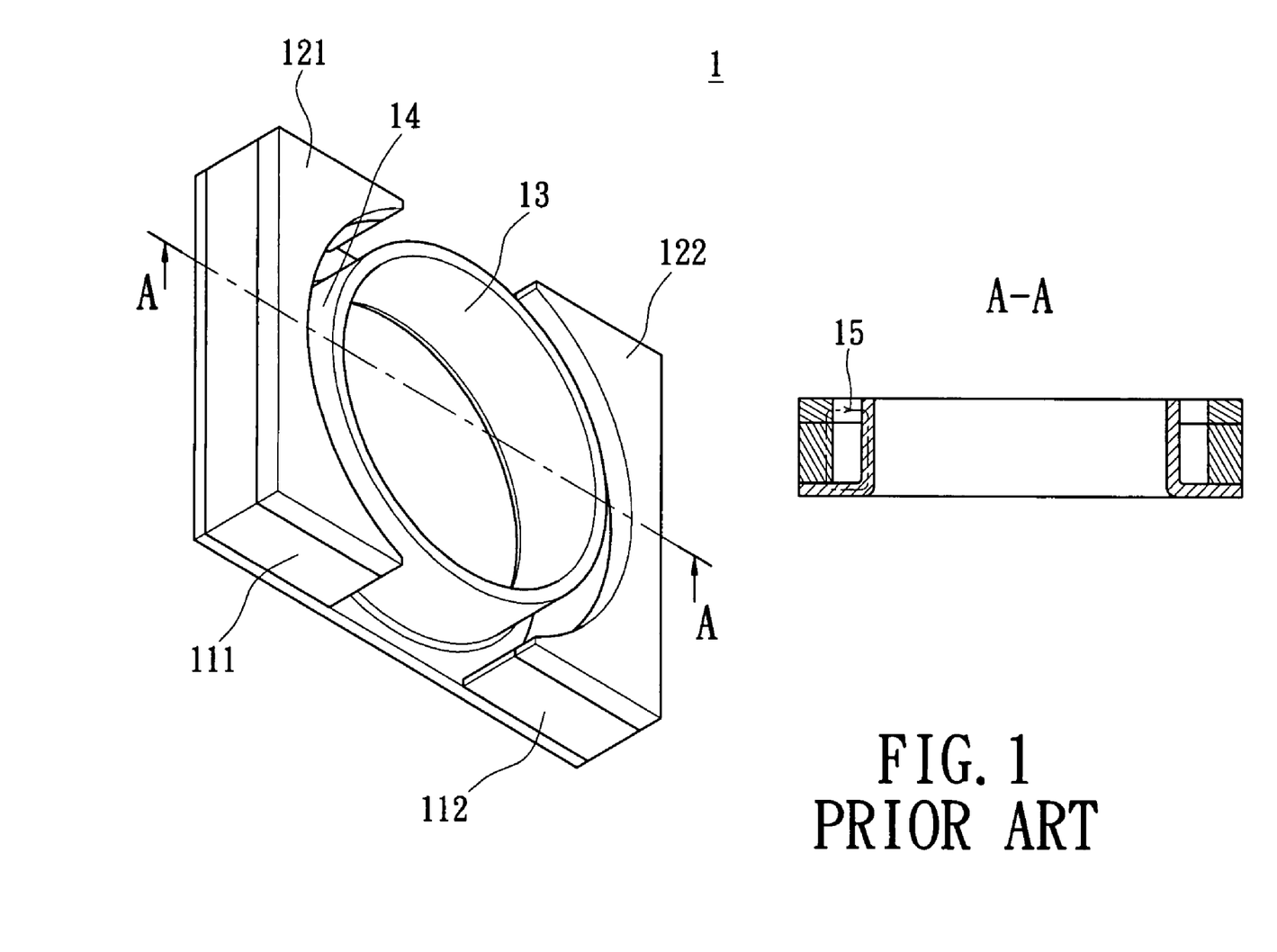
FIG. 1 shows a structural diagram of a voice coil motor magnetic circuit in prior art.

Referring to FIG. 1, a structural diagram of a Voice Coil Motor (VCM) magnetic circuit in prior art is shown. The magnetic circuit part of a prior art VCM 1 is composed of two non-ring magnets 111, 112, two non-ring surface yoke blocks 121, 122 as well as a base yoke block 13 with a central ring wall, stacked up along the direction of VCM axle. The magnetic circuit of the prior art VCM 1 provides a closed magnetic circuit, which is used to generate magnetic flux 15. The magnetic flux 15 emerges from the upper surfaces of the two non-ring magnets 111, 112, through the two non-ring surface yoke blocks 121, 122, turns to inner ring gap 14, and reaches the central ring wall of the base yoke block 13, then further with guidance of the base yoke block 13, returns to the lower surfaces of the two non-ring magnets 111, 112. The design of this type of closed magnetic circuit uses two non-ring surface yoke blocks 121, 122 as guides of the magnetic flux 15 emitted from the two non-ring magnets 111, 112, obtaining the effect of magnetic flux 15 concentration, so as to generate sufficient displacement force.

The aforementioned VCM 1 is required to use yoke blocks for guiding the magnetic flux 15 to penetrate the coil (not shown) for generating displacement effect; however, the installation of yoke blocks increases the difficulty in manufacture. Meanwhile, it also restricts the installation of other components, causing bottleneck on size-reduction attempt.

SUMMARY OF THE INVENTION

Regarding to the above-stated issues, in terms of the required features about limited space for lens installation in image-capturing module as well as the ability of lens motion, the present invention employs the voice coil based linear displacement approach to provide a lens displacement device with efficiency and suitable for image-capturing module lens displacement, which allows the image-capturing module equipped with the lens displacement device according to the present invention to demonstrate the advantages of small size, fast motion, quietness and low price.

The lens displacement device according to the present invention comprises: a lens slide base, a first hollow magnet, a hollow magnetic conducting plate, a second hollow magnet and a hollow coil. The hollow magnetic conducting plate has a first magnetic pole side and a second magnetic pole side, in which the first magnetic pole side is magnetically connected to the first hollow magnet, and the second magnetic pole side is magnetically connected to the second hollow magnet, which combined to form a magnetically connected assembly. The hollow coil is placed at the outer or inner perimeter of the magnetically connected assembly. The hollow coil surrounds the magnetically connected assembly and they have a gap in-between them to allow for sliding; wherein the lens slide base rigidly connects the first hollow magnet of the magnetically connected assembly or the hollow coil to form a movable part.

The first hollow magnet and the second hollow magnet are magnetically connected to the hollow magnetic conducting plate with the same polarity, and the hollow magnetic conducting plate takes in the magnetic flux emitted from the first hollow magnet and the second hollow magnet, allowing the magnetic flux to pass through the hollow coil and also the interaction with the electro-magnetic field generated after the electric conductance on the hollow coil, so as to create electromagnetic driving force to drive the movable part.

In order to further understand the characteristics and technical contents of the present invention, references are made to the detailed descriptions and appended drawings hereunder; whereas the appended drawings are merely for the purpose of exemplary illustration, rather than used to restrict the scope of the present invention.

DETAILED DESCRIPTION OF THE PREFERRED EMBODIMENTS

Figure 2:
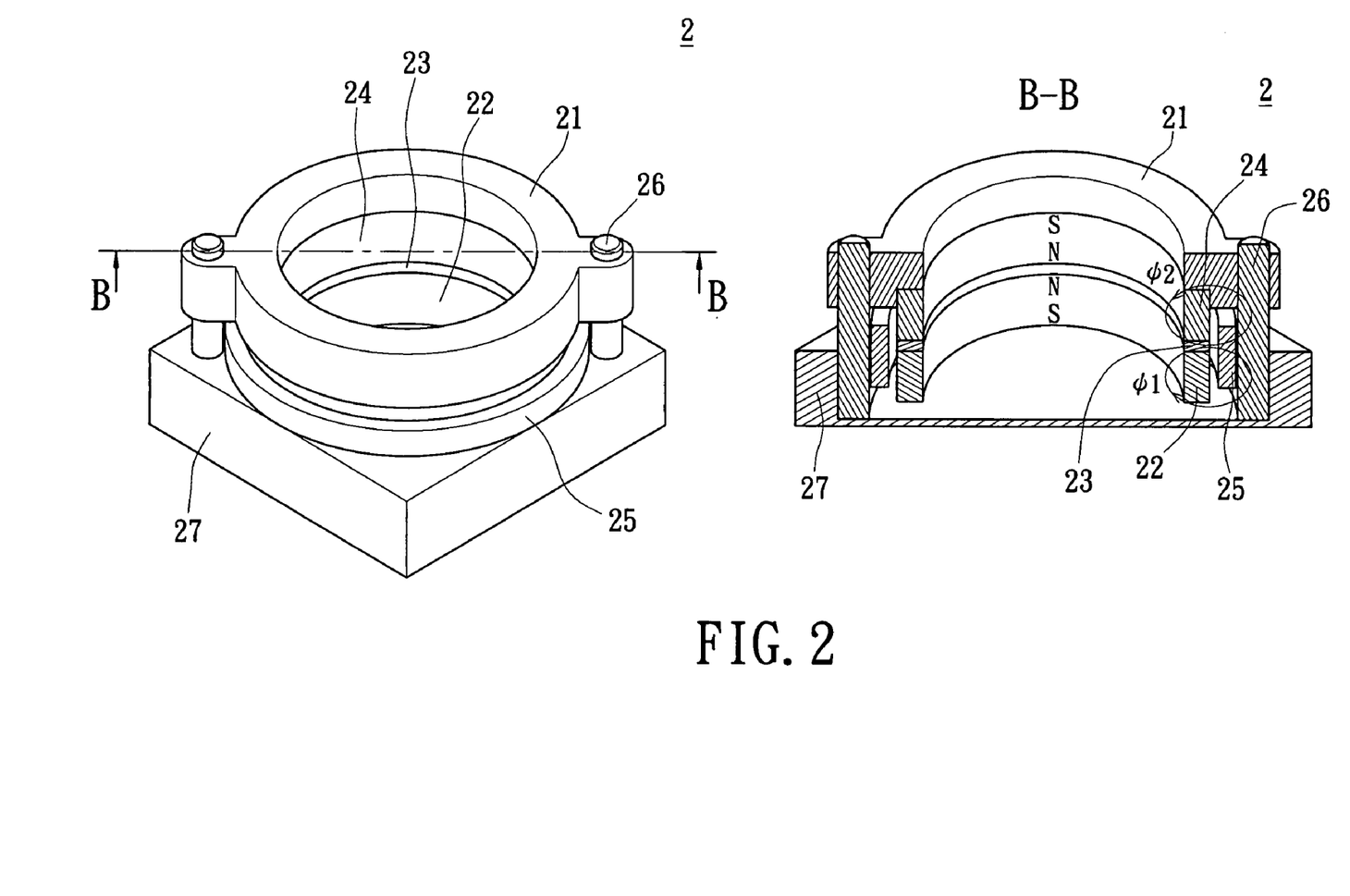
FIG. 2 shows a structural diagram of the lens displacement device magnetic circuit according to a first embodiment of the present invention.

Referring now to FIG. 2, a structural diagram of the lens displacement device magnetic circuit according to a first embodiment of the present invention is shown. The lens displacement device 2 comprises: a lens slide base 21, a first hollow magnet 22, a hollow magnetic conducting plate 23, a second hollow magnet 24, a hollow coil 25, at least one fixed shaft 26 and a base 27. As illustrated in FIG. 2, the first hollow magnet 22 is fixed to the lens slide base 21, and the lens slide base 21 is installed with a lens (not shown) for image capturing. The hollow magnetic conducting plate 23 has a first magnetic pole side and a second magnetic pole side, in which the first magnetic pole side is magnetically connected to the first hollow magnet 22, and the second magnetic pole side is magnetically connected to the second hollow magnet 24, which combined to form a magnetically connected assembly.

The hollow coil 25 is placed at the outer or inner perimeter of the magnetically connected assembly. The hollow coil 25, surrounds the magnetically connected assembly and they have a gap in-between them to allow for sliding. Herein the lens slide base 21, the first hollow magnet 22, the hollow magnetic conducting plate 23 and the second hollow magnet 24 together form a movable part; whereas the hollow coil 25 is fixed to the base 27, constituting a non-movable part.

Referring again to FIG. 2, the first hollow magnet 22 and the second hollow magnet 24 are magnetically connected to the hollow magnetic conducting plate 23 with the same polarity, and the hollow magnetic conducting plate 23 takes in the magnetic fluxes $\Phi 1$, $\Phi 2$ emitted from the first hollow magnet 22 and the second hollow magnet 24, guiding the magnetic fluxes $\Phi 1$, $\Phi 2$ to pass through the hollow coil 25, enabling the interaction with the electromagnetic field generated after the electric conductance on the hollow coil 25, so as to create electromagnetic driving force to drive the movable part.

Since the first hollow magnet 22 and the second hollow magnet 24 are magnetically connected to the hollow magnetic conducting plate 23 with the same polarity, the emitted magnetic fluxes $\Phi 1$, $\Phi 2$ thus generate repulsive force, rather than being mutually attractive; meanwhile, the magnetic fluxes $\Phi 1$, $\Phi 2$ are concentrated. The magnetic fluxes $\Phi 1$, $\Phi 2$ respectively emerges from the N pole of the first hollow magnet 22 and the N pole of the second hollow magnet 24, through guidance of the hollow magnetic conducting plate 23, turns to the gap, wherein the magnetic fluxes $\Phi 1$, $\Phi 2$ penetrate the hollow coil 25 through the gap and respectively return to the S pole of the first hollow magnet 22 and the S pole of the second hollow magnet 24, forming thereby two closed magnetic circuits. Upon the penetration of the magnetic fluxes $\Phi 1$, $\Phi 2$ through the hollow coil 25, they interact with the electromagnetic field generated by the hollow coil 25, further creating electromagnetic driving force.

By means of the in-take and collection of magnetic fluxes $\Phi 1$, $\Phi 2$ emitted by the two hollow magnets 22, 24 through the hollow magnetic conducting plate 23, and guidance of the magnetic fluxes $\Phi 1$, $\Phi 2$ to penetrate the hollow coil 25, the present invention allows the magnetic fluxes $\Phi 1$, $\Phi 2$ emitted from the two hollow magnets 22, 24 not to leak, facilitating efficient acquisition of sufficient displacement force to move the lens.

At the same time, by means of the design of making the first hollow magnet 22 and the second hollow magnet 24 magnetically connected to the hollow magnetic conducting plate 23 with the same polarity, it can allow the magnetic fluxes $\Phi 1$, $\Phi 2$ emitted from the two hollow magnets 22, 24 to form repulsive action, without generation of magnetic cross-chain reaction causing mutual influence on the magnetic fluxes $\Phi 1$, $\Phi 2$.

Referring again to FIG. 2, those fixed shafts 26 in the lens displacement device 2 according to the present invention act as the motion guide of the movable part, wherein one fixed shaft 26 of the fixed shafts 26 is composed of magnetic conducting materials. In addition to act as a motion guide for the movable part by using the fixed shaft 26, the lens displacement device 2 according to the present invention may also act as a motion guide for the movable part with a suspension part (not shown).

Herein the present invention is exemplarily described with the fixed shaft 26, in which the fixed shaft 26 with magnetic conductance is placed on one internal edge of the loading side of the lens slide base 21, and keeps at a gap from the hollow coil 25 via the loading side. The magnetic fluxes $\Phi 1$, $\Phi 2$ emitted from the two hollow magnets 22, 24 are concentrated by the hollow magnetic conducting plate 23, penetrating the hollow coil 25, further through the gap to magnetically cross-chain with the magnetically conducting fixed shaft 26, so as to form closed magnetic circuit and generate magnetic force with a prescribed pressure. The composite torque formed by the magnetic force with a prescribed pressure can make the magnetically conducting fixed shaft 26 to closely sliding contact with the loading side of the lens slide base 21, achieving thus sliding movement without self-containing biased swing.

The lens displacement device 2 according to the present invention may employ a lens positioning mechanism (not shown) as the control for the lens position of the present invention. The lens positioning mechanism is composed of a control circuit and a prescribed pressure generating component, for controlling the movement of the movable part in the present invention. The control circuit is an open-loop control circuit or a closed-loop control circuit, and the prescribed pressure generating component is a line-based prescribed pressure generating component, a magnetic prescribed pressure generating component or a piezoelectric plate prescribed pressure generating component.

Furthermore, the lens positioning mechanism used in the lens displacement device 2 according to the present invention may be composed of a control circuit and a motion sensing component as well. The control circuit is a closed-loop control circuit, while the motion sensing component may be a photo-sensing motion sensing component, a magnetic sensing motion sensing component or a piezoelectric sensing motion sensing component.

Figure 3:
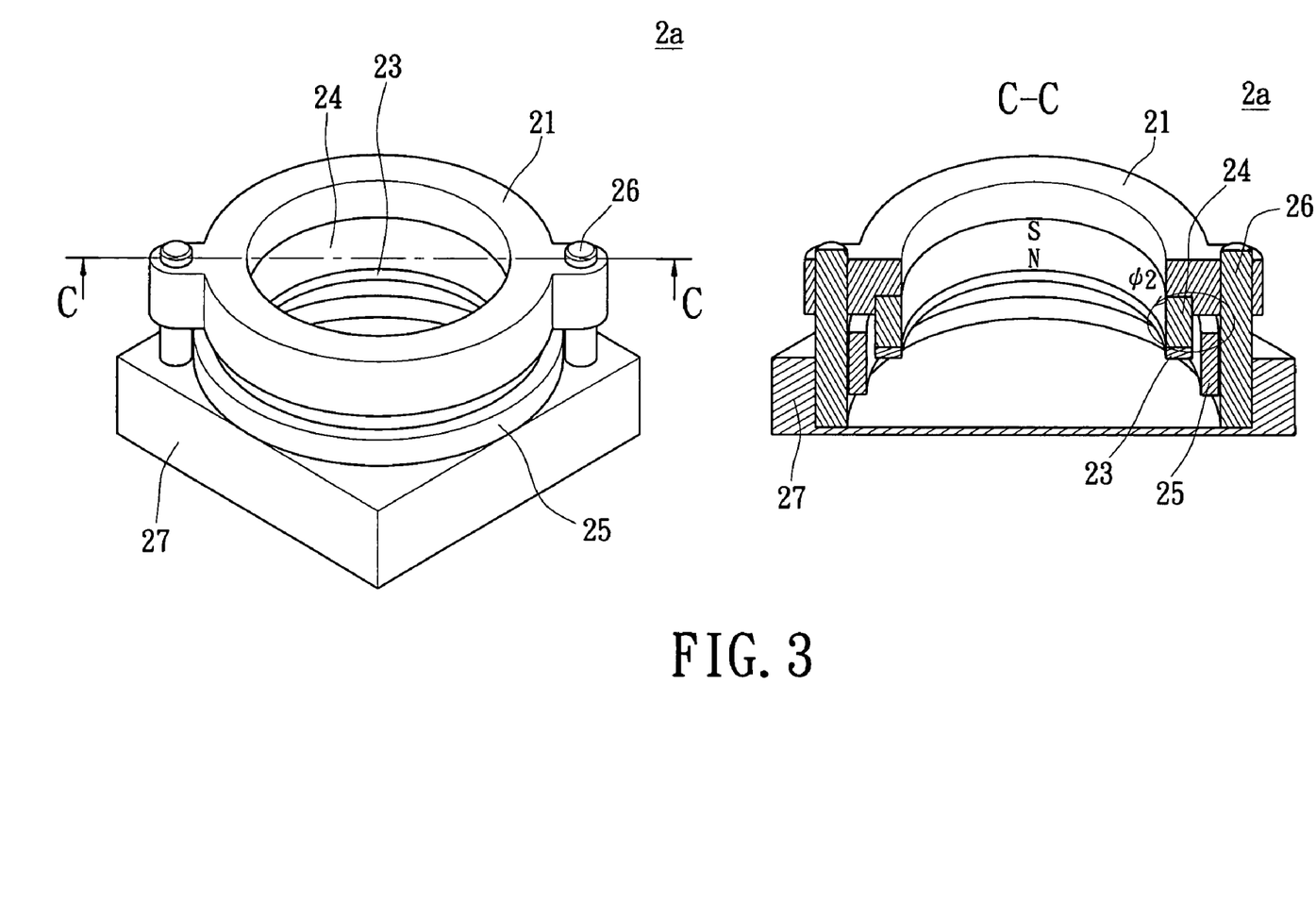
FIG. 3 shows a structural diagram of the lens displacement device magnetic circuit according to a second embodiment of the present invention.

In conjunction with FIG. 2, refer now to FIG. 3, in which a structural diagram of the lens displacement device magnetic circuit according to a second embodiment of the present invention is shown. The components used in the lens displacement device 2a of the second embodiment according to the present invention are identical to those used in the lens displacement device 2 of the first embodiment, indicated with the same reference marks. The operational principle and achieved effects in the magnetic circuits and electric circuits respectively used in the first and second embodiments are also identical; in comparing these two examples, the major differences lie in: the first hollow magnet 22 in the first embodiment is omitted in the second embodiment, which uses only the second hollow magnet 24 to provide magnetic flux Φ2. Similarly, the hollow magnetic conducting plate 23 takes in the magnetic flux Φ2 emitted from the second hollow magnet 24, allowing the magnetic flux Φ2 to penetrate the hollow coil 25, interacting with the electromagnetic field generated by the hollow coil 25, so as to generate electromagnetic driving force to drive the movable part.

In the lens displacement device 2a of the second embodiment of the present invention, the magnetic flux Φ2 emerges from the N pole of the second hollow magnet 24, and is concentrated and guided by the hollow magnetic conducting plate 23, then turns to the gap, wherein the magnetic flux Φ2 penetrates the hollow coil 25 via the gap, returning to the S pole of the second hollow magnet 24, thus forming a closed magnetic circuit. When the magnetic flux Φ2 penetrates through the hollow coil 25, it interacts with the electro-magnetic field generated by the hollow coil 25, further generating an electro-magnetic driving force.

Figure 4:
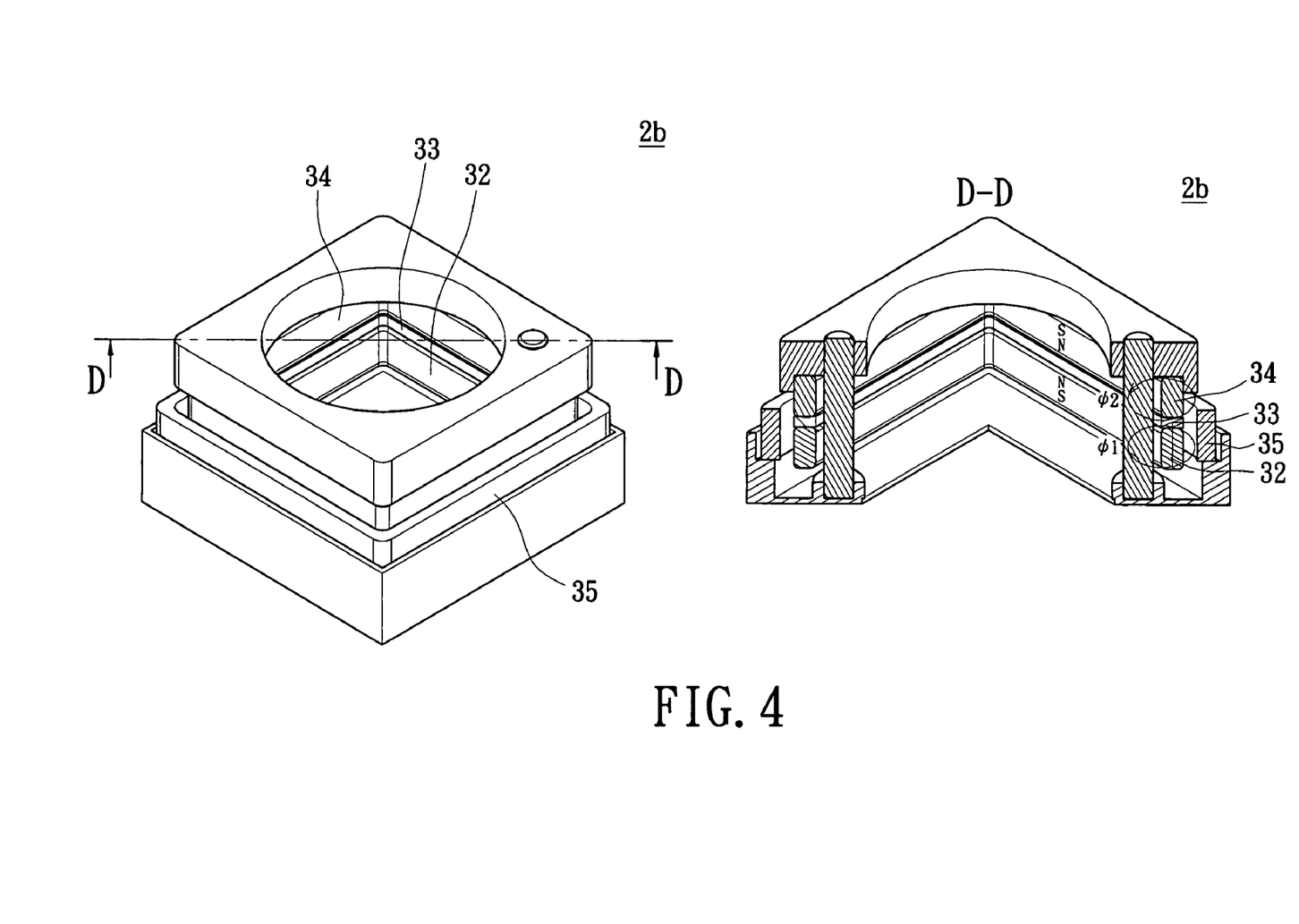
FIG. 4 shows a structural diagram of the lens displacement device magnetic circuit according to a third embodiment of the present invention.

In conjunction with FIG. 2, referring now to FIG. 4, a structural diagram of the lens displacement device magnetic circuit according to a third embodiment of the present invention is shown. The operational principle and achieved effects in the magnetic circuits and electric circuits respectively used in the first and third embodiments are identical; in comparing these two examples, the major differences lie in: in the first embodiment, the magnetic circuit structure of the lens displacement device 2 is composed of the hollow magnets 22, 24, hollow magnetic conducting plate 23 and the hollow coil 25; whereas, in the third embodiment of the present invention, the magnetic circuit structure of the lens displacement device 2b is composed of square-shaped hollow magnets 32, 34, square-shaped hollow magnetic conducting plate 33 and square-shaped hollow coil 35.

Figure 5:
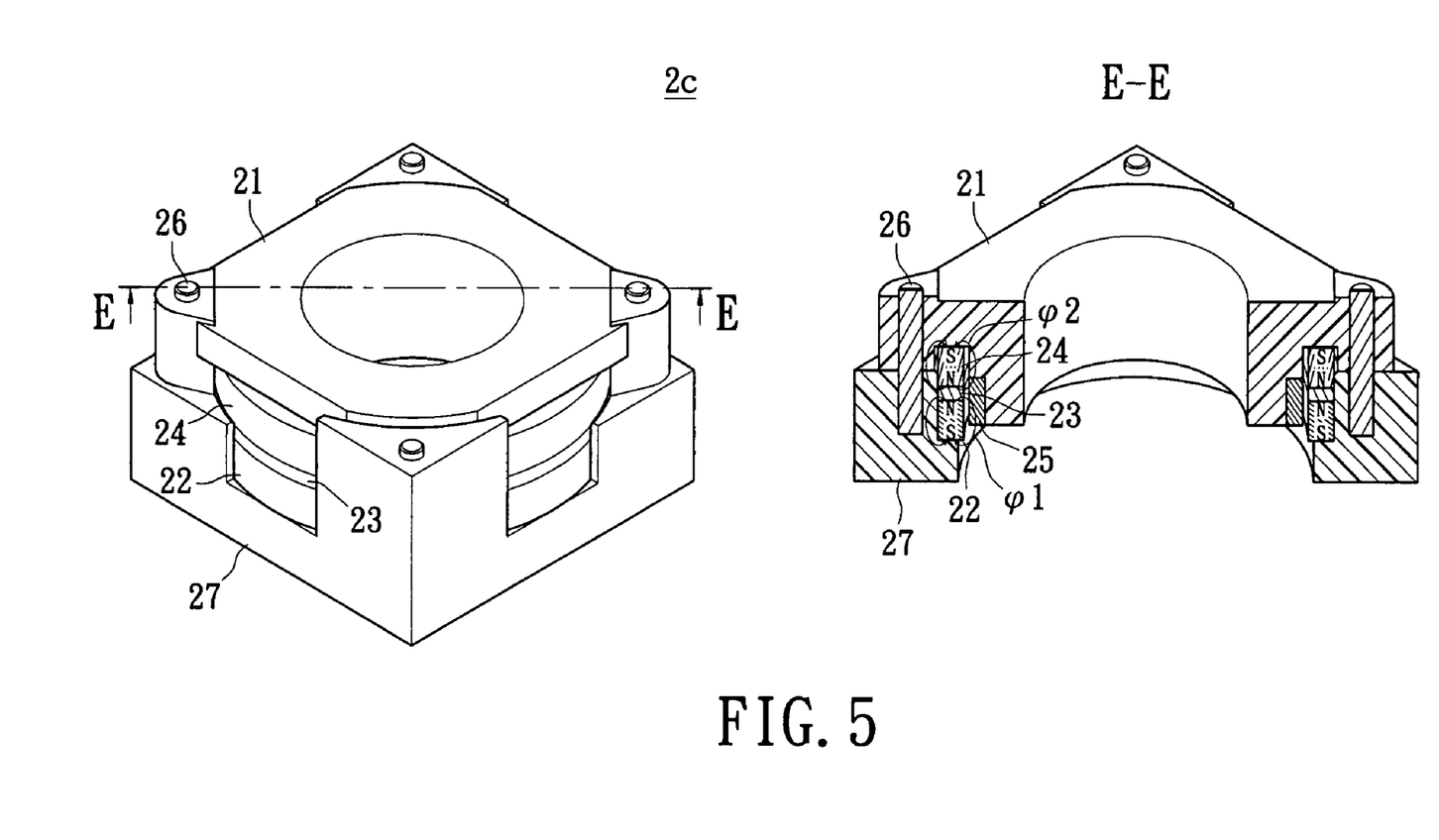
FIG. 5 shows a structural diagram of the lens displacement device magnetic circuit according to a fourth embodiment of the present invention.

In conjunction with FIG. 2, referring now to FIG. 5, a structural diagram of the lens displacement device magnetic circuit according to a fourth embodiment of the present invention is shown. The components used in the lens displacement device 2c of the fourth embodiment according to the present invention are identical to those used in the lens displacement device 2 of the first embodiment, indicated with the same reference marks. The operational principle and achieved effects in the magnetic circuits and electric circuits respectively used in the first and fourth embodiments are also identical; in comparing these two examples, the major differences lie in: the hollow coil 25 in the fourth embodiment is fixed to the lens slide base 21, and the hollow coil 25 is placed at the inner perimeter of the magnetically connected assembly included the first hollow magnet 22, the hollow magnetic conducting plate 23 and the second hollow magnet 24, and the hollow coil 25 surrounds the magnetically connected assembly and they have a gap (not shown) in-between them to allow for sliding. Herein the lens slide base 21 and the hollow coil 25 together form a movable part. Also, the first hollow magnet 22, the hollow magnetic conducting plate 23 and the second hollow magnet 24 are fixed to the base 27, forming a non-movable part.

Figure 6:
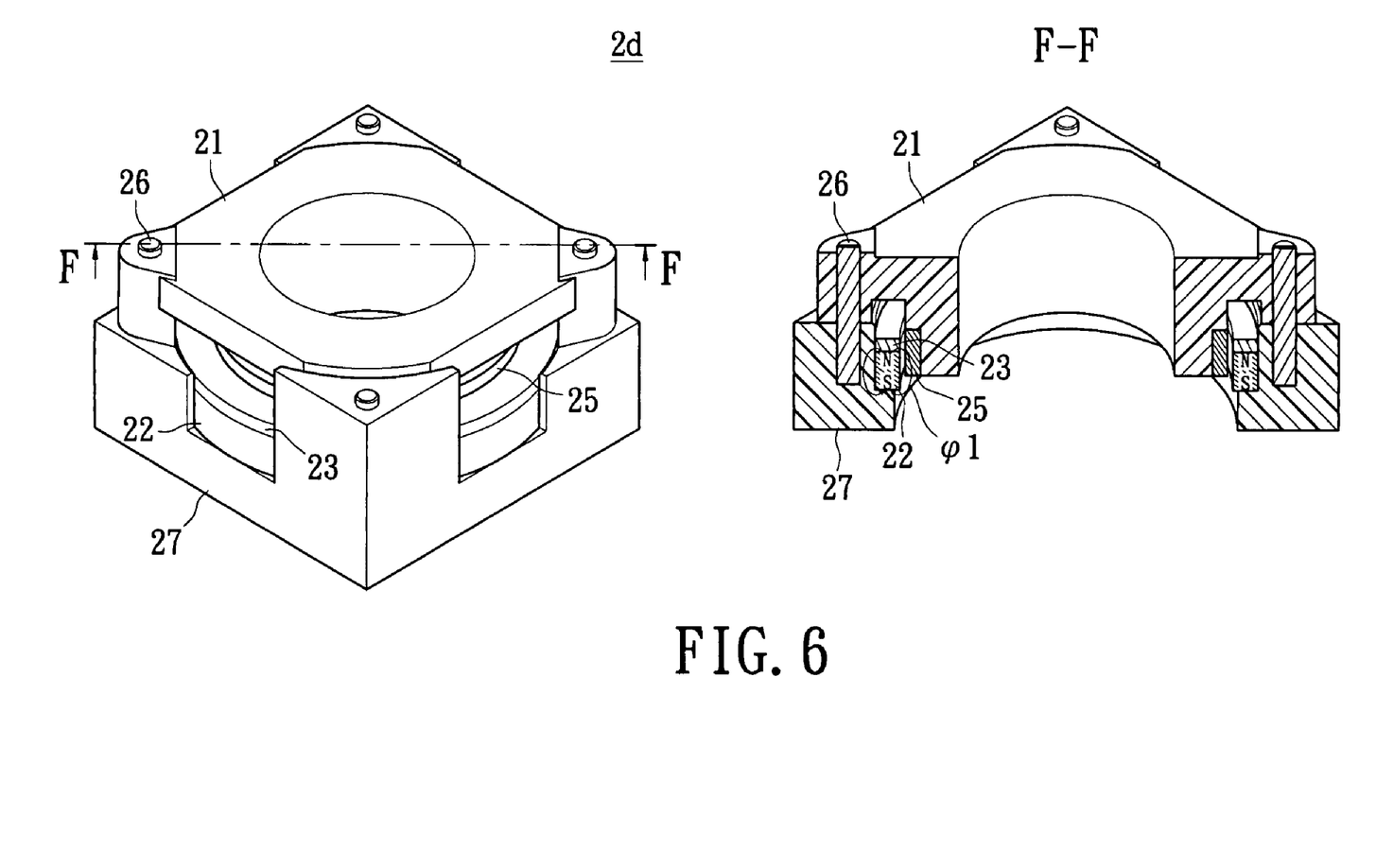
FIG. 6 shows a structural diagram of the lens displacement device magnetic circuit according to a fifth embodiment of the present invention.

In conjunction with FIG. 5, refer now to FIG. 6, in which a structural diagram of the lens displacement device magnetic circuit according to a fifth embodiment of the present invention is shown. The components used in the lens displacement device 2d of the fifth embodiment according to the present invention are identical to those used in the lens displacement device 2c of the fourth embodiment, indicated with the same reference marks. The operational principle and achieved effects in the magnetic circuits and electric circuits respectively used in the fifth and fourth embodiments are also identical; in comparing these two examples, the major differences lie in: the second hollow magnet 24 in the fourth embodiment is omitted in the fifth embodiment, which uses only the first hollow magnet 22 to provide magnetic flux Φ1. Similarly, the hollow magnetic conducting plate 23 takes in the magnetic flux Φ2 emitted from the first hollow magnet 22, allowing the magnetic flux Φ1 to penetrate the hollow coil 25, interacting with the electromagnetic field generated by the hollow coil 25, so as to generate electromagnetic driving force to drive the movable part.

Figure 7:
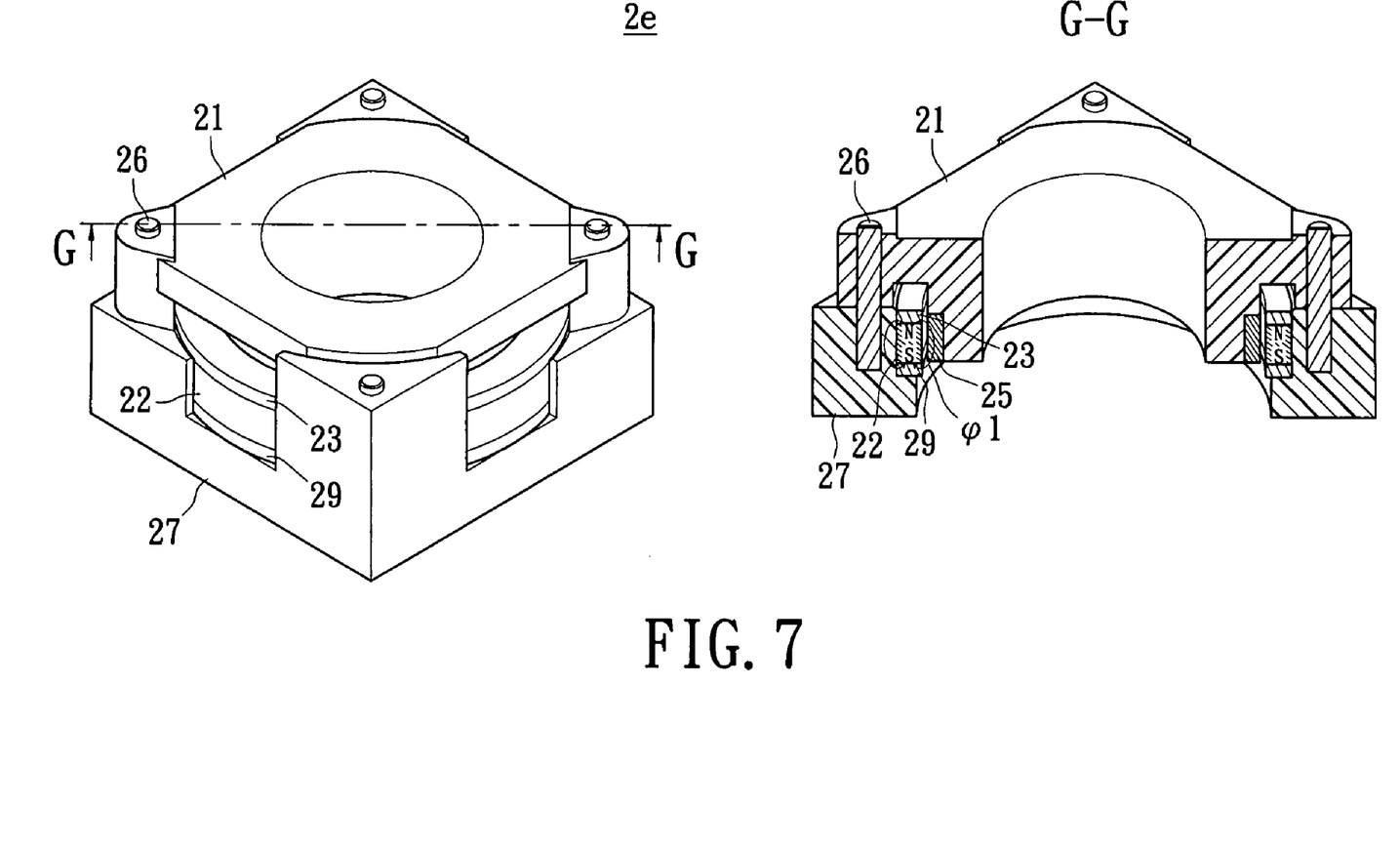
FIG. 7 shows a structural diagram of the lens displacement device magnetic circuit according to a sixth embodiment of the present invention.

In conjunction with FIG. 6, referring now to FIG. 7, a structural diagram of the lens displacement device magnetic circuit according to a sixth embodiment of the present invention is shown. The components used in the lens displacement device 2e of the sixth embodiment according to the present invention are identical to those used in the lens displacement device 2d of the fifth embodiment, indicated with the same reference marks. The operational principle and achieved effects in the magnetic circuits and electric circuits respectively used in the sixth and fifth embodiments are also identical; in comparing these two examples, the major differences lie in: the sixth embodiment provides a first hollow magnetic conducting plate 23 and a second hollow magnetic conducting plate 29, which are magnetically connected to the first magnetic pole side and the second magnetic pole side of the first hollow magnet 22, respectively. Meanwhile, the first hollow magnetic conducting plate 23 and the second hollow magnetic conducting plate 29, together with the first hollow magnet 22, form a non-movable part.

In the lens displacement device 2e of the sixth embodiment according to the present invention, the magnetic flux Φ1 emerges from the N pole of the first hollow magnet 22, is concentrated by the first hollow magnetic conducting plate 23, and through guidance of the first hollow magnetic conducting plate 23, turns to the gap, wherein the magnetic flux Φ1 penetrates the hollow coil 25 through the gap, is concentrated by the second hollow magnetic conducting plate 29, then, through guidance of the second hollow magnetic conducting plate 23 returns to the S pole of the first hollow magnet 22, forming thereby a closed magnetic circuit. Upon the penetration of magnetic flux Φ1 through the hollow coil 25, it interacts with the electromagnetic field generated by the hollow coil 25, further creating electromagnetic driving force.

In summary, according to the present invention, two hollow magnets are placed at the perimeter of the lens, which are concentric with the light axle of the lens and oppose to each other with the same polarity, and between the two hollow magnets there installs a hollow magnetic conducting plate to take in the magnetic flux emitted from the opposing magnetic poles in these two hollow magnets, making the magnetic flux turn to a direction vertical to the light axle, in which a hollow coil is placed at the outer or inner perimeter of the two hollow magnets, and the hollow coil surrounds the two hollow magnets and they have a gap in-between them to allow for sliding. The above-mentioned installation allows the magnetic flux radiated from the hollow magnets in the direction vertical to the light axle through the hollow magnetic conducting plate to penetrate the hollow coil, interacting with the electromagnetic field generated by the coil, so as to create electromagnetic driving force enabling lens motion. In this way, the present invention is possible to effectively employ magnetic flux emitted from small magnets within a limited space, in order to generate sufficient electromagnetic driving force to move the lens.

Hence, the present invention meets the requirement of patent application in terms of industrial innovation and progression, herein filed for legal protections to the rights of the present inventors based on all applicable laws, codes or other legal regulations.

The descriptions set out supra illustrate merely the preferred embodiments of the present invention; the characteristics thereof, however, are not restricted thereto. All alternations, modifications and/or substitutions that skilled ones in the relevant art can conveniently make in the field of the present invention are deemed to be encompassed in the scope of the present invention defined by the claims enlisted hereunder.

What is claimed is:

1. A lens displacement device, comprising: a first hollow magnet;
   a hollow magnetic conducting plate, which has a first magnetic pole side and a second magnetic pole side, in which the first magnetic pole side is magnetically connected to the first hollow magnet;
   a second hollow magnet, which is magnetically connected to the second magnetic pole side of the hollow magnetic conducting plate, wherein the first hollow magnet, the hollow magnetic conducting plate and the second hollow magnet are combined to form a magnetically connected assembly;
   a hollow coil, which is placed at the outer or inner perimeter of the magnetically connected assembly, and the hollow coil surrounds the magnetically connected assembly and they have a gap in-between them to allow for sliding;
   a lens slide base, which rigidly connects the first hollow magnet of the magnetically connected assembly or the hollow coil;
   wherein the lens slide base, the first hollow magnet, the hollow magnetic conducting plate and the second hollow magnet form a movable part, or the lens slide base and the hollow coil form a movable part;
   a base, used to fix the hollow coil, forming a non-movable part, or is used to fix the first hollow magnet, the hollow magnetic conducting plate and the second hollow magnet, forming a non-movable part; and
   a lens positioning mechanism, comprising a control circuit and a pressure generating component, for controlling the movement of the movable part.

2. The lens displacement device according to claim 1, wherein the first hollow magnet and the second hollow magnet are magnetically connected, with the same polarity, to the first magnetic pole side and the second magnetic pole side of the hollow magnetic conducting plate.

3. The lens displacement device according to claim 1, further comprising at least one fixed shaft, connected between the base and the lens slide base, acting as a motion guide of the movable part.

4. The lens displacement device according to claim 3, wherein said at least one fixed shaft is composed of magnetic conducting materials.

5. The lens displacement device according to claim 1, further comprising a suspension part, in which the suspension part acts as a motion guide of the movable part.

6. The lens displacement device according to claim 1, wherein the control circuit is an open-loop control circuit or a closed-loop control circuit.

7. The lens displacement device according to claim 1, wherein the prescribed pressure generating component is a line-based prescribed pressure generating component, a magnetic prescribed pressure generating component or a piezoelectric plate prescribed pressure generating component.

8. A lens displacement device, comprising:
   a first hollow magnet;
   a hollow magnetic conducting plate, which has a first magnetic pole side and a second magnetic pole side, in which the first magnetic pole side is magnetically connected to the first hollow magnet;
   a second hollow magnet, which is magnetically connected to the second magnetic pole side of the hollow magnetic conducting plate, wherein the first hollow magnet, the hollow magnetic conducting plate and the second hollow magnet are combined to form a magnetically connected assembly;
   a hollow coil, which is placed at the outer or inner perimeter of the magnetically connected assembly, and the hollow coil surrounds the magnetically connected assembly and they have a gap in-between them to allow for sliding;
   a lens slide base, which rigidly connects the first hollow magnet of the magnetically connected assembly or the hollow coil;
   wherein the lens slide base, the first hollow magnet, the hollow magnetic conducting plate and the second hollow magnet form a movable part, or the lens slide base and the hollow coil form a movable part;
   a base, used to fix the hollow coil, forming a non-movable part, or is used to fix the first hollow magnet, the hollow magnetic conducting plate and the second hollow magnet, forming a non-movable part; and
   a lens positioning mechanism, comprising a control circuit and a motion sensing component, for controlling the movement of the movable part.

9. The lens displacement device according to claim 8, wherein the control circuit is a closed-loop control circuit.

10. The lens displacement device according to claim 8, wherein the motion sensing component is a photo-sensing motion sensing component, a magnetic sensing motion sensing component or a piezoelectric sensing motion sensing component.

11. A lens displacement device, comprising: a hollow magnet;
   a first hollow magnetic conducting plate, which is magnetically connected to a first magnetic pole side of the hollow magnet, wherein the hollow magnet and the first hollow magnetic conducting plate are combined to form a magnetically connected assembly;
   a hollow coil, which is placed at the outer or inner perimeter of the magnetically connected assembly, and the hollow coil surrounds the magnetically connected assembly and they have a gap in-between them to allow for sliding; a lens slide base, which rigidly connects the hollow magnet of the magnetically connected assembly or the hollow coil;
   wherein the lens slide base, the hollow magnet, and the first hollow magnetic conducting plate form a movable part, or the lens slide base and the hollow coil form a movable part;
   a base, used to fix the hollow coil, forming a non-movable part, or is used to fix the hollow magnet and the first hollow magnetic conducting plate, forming a non-movable part; and
   a lens positioning mechanism, comprising a control circuit and a pressure generating component, for controlling the movement of the movable part.

12. The lens displacement device according to claim 11, further comprising at least one fixed shaft, placed between the base and the lens slide base, acting as a motion guide of the movable part.

13. The lens displacement device according to claim 12, wherein said at least one fixed shaft is composed of magnetic conducting materials.

14. The lens displacement device according to claim 11, further comprising a suspension part, in which the suspension part acts as a motion guide of the movable part.

15. The lens displacement device according to claim 11, wherein the control circuit is an open-loop control circuit or a closed-loop control circuit.

16. The lens displacement device according to claim 11, wherein the prescribed pressure generating component is a line-based prescribed pressure generating component, a magnetic prescribed pressure generating component or a piezoelectric plate prescribed pressure generating component.

17. The lens displacement device according to claim 11, further comprising a second hollow magnetic conducting plate, in which the second hollow magnetic conducting plate is magnetically connected to a second magnetic pole side of the hollow magnet.

18. A lens displacement device, comprising:

a hollow magnet;

a first hollow magnetic conducting plate, which is magnetically connected to a first magnetic pole side of the hollow magnet, wherein the hollow magnet and the first hollow magnetic conducting plate are combined to form a magnetically connected assembly;

a hollow coil, which is placed at the outer or inner perimeter of the magnetically connected assembly, and the hollow coil surrounds the magnetically connected assembly and they have a gap in-between them to allow for sliding; a lens slide base, which rigidly connects the hollow magnet of the magnetically connected assembly or the hollow coil;

wherein the lens slide base, the hollow magnet, and the first hollow magnetic conducting plate form a movable part, or the lens slide base and the hollow coil form a movable part;

a base, used to fix the hollow coil, forming a non-movable part, or is used to fix the hollow magnet and the first hollow magnetic conducting plate, forming a non-movable part; and a lens positioning mechanism, comprising a control circuit and a motion sensing component, for controlling the movement of the movable part.

19. The lens displacement device according to claim 18, wherein the control circuit is a closed-loop control circuit.

20. The lens displacement device according to claim 18, wherein the motion sensing component is a photo-sensing motion sensing component, a magnetic sensing motion sensing component or a piezoelectric sensing motion sensing component.

21. The lens displacement device according to claim 18, further comprising a second hollow magnetic conducting plate, in which the second hollow magnetic conducting plate is magnetically connected to a second magnetic pole side of the hollow magnet.

* * * * *